(12) United States Patent
Ng et al.

(10) Patent No.: US 12,137,868 B2
(45) Date of Patent: *Nov. 12, 2024

(54) ELECTRONIC DEVICE CONTROLLING LIGHT SOURCES ACCORDING TO OPTICAL VARIATION

(71) Applicant: PixArt Imaging Inc., Hsin-Chu (TW)

(72) Inventors: Muan Sian Ng, Penang (MY); Wan Piang Lim, Penang (MY); Hui-Hsuan Chen, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/378,624

(22) Filed: Oct. 10, 2023

(65) Prior Publication Data

US 2024/0032756 A1 Feb. 1, 2024

Related U.S. Application Data

(63) Continuation of application No. 17/970,596, filed on Oct. 21, 2022, now Pat. No. 11,819,184, which is a
(Continued)

(51) Int. Cl.
*A47L 9/28* (2006.01)
*A47L 9/30* (2006.01)
(Continued)

(52) U.S. Cl.
CPC ............... *A47L 9/2826* (2013.01); *A47L 9/30* (2013.01); *B25J 19/023* (2013.01);
(Continued)

(58) Field of Classification Search
CPC ........ A47L 9/30; A47L 9/2852; A47L 9/2805; A47L 9/2826; A47L 9/2857; A47L 11/00; A47L 2201/04; A47L 2201/06; A47L 11/4011; G05D 1/02; G05D 1/0238; G05D 1/0274; G05D 1/0248; G05D 2201/0203;
(Continued)

(56) References Cited

U.S. PATENT DOCUMENTS 6,658,325 B2 12/2003 Zweig
8,041,483 B2 10/2011 Breed
(Continued)

OTHER PUBLICATIONS

Alet et al., Dynamic Surface Temperature Measurements in ICs, 2006, IEEE, p. 1-15 (Year: 2006).*
(Continued)

*Primary Examiner* — McDieunel Marc
(74) *Attorney, Agent, or Firm* — Winston Hsu

(57) ABSTRACT

An electronic device, comprising: a first light source, configured to emit first light; a second light source, configured to emit second light; an optical sensor, configured to sense optical data generated according to reflected light of the second light or according to reflected light of the first light; and a control circuit, configured to analyze optical information of the optical data. If the control circuit determines variation of the optical information is larger than a variation threshold, the control circuit controls the first light source to be non-activated and the second light source to be activated.

11 Claims, 5 Drawing Sheets

Related U.S. Application Data continuation of application No. 16/425,955, filed on May 30, 2019, now Pat. No. 11,510,539, which is a continuation-in-part of application No. 15/841,376, filed on Dec. 14, 2017, now Pat. No. 10,627,518.

(60) Provisional application No. 62/514,349, filed on Jun. 2, 2017.

(51) Int. Cl.
  *B25J 19/02* (2006.01)
  *G06T 7/00* (2017.01)
  *A47L 11/00* (2006.01)

(52) U.S. Cl.
  CPC ............ *G06T 7/0004* (2013.01); *A47L 11/00* (2013.01); *A47L 2201/04* (2013.01); *A47L 2201/06* (2013.01); *G06T 2207/30261* (2013.01)

(58) Field of Classification Search
  CPC .............. B25J 19/023; G06T 7/0004; G06T 2207/30261; G06T 7/521; G06T 2207/10152; G06T 2207/10004; G01S 7/4816; G01S 17/931; G01S 17/46; G01S 17/50; G01S 7/4815; G01S 7/4808; G01S 17/66; G01S 17/08; G01S 17/48; G01B 11/25; H04N 5/2252; H04N 5/2256; H04N 5/2257; H04N 5/33; G06V 20/00
  See application file for complete search history.

(56) References Cited

U.S. PATENT DOCUMENTS

| | | | |
|---|---|---|---|
| 8,321,082 B2 | 11/2012 | Ando | |
| 8,340,850 B2 | 12/2012 | Muta | |
| 9,073,566 B2* | 7/2015 | Takenaka | B60W 40/068 |
| 11,510,539 B2* | 11/2022 | Ng | A47L 9/2852 |
| 11,819,184 B2* | 11/2023 | Ng | G05D 1/02 |
| 2008/0208391 A1* | 8/2008 | Hasegawa | B62D 57/032 |
| | | | 700/254 |
| 2012/0173040 A1* | 7/2012 | Yokota | B60W 40/114 |
| | | | 701/1 |
| 2013/0056032 A1 | 3/2013 | Choe | |
| 2015/0296599 A1 | 10/2015 | Recker | |
| 2018/0050634 A1 | 2/2018 | White | |
| 2018/0147724 A1* | 5/2018 | Oaki | B25J 9/1638 |
| 2021/0107177 A1 | 4/2021 | Giles | |

OTHER PUBLICATIONS

Martin et al., Design of a low-cost optical instrument for pH fluorescence measurements, 2006, IEEE, p. 1215-1221 (Year: 2006).*

Karim et al., Electrooptic displays for optical information processing, 1996, IEEE, p. 814-827 (Year: 1996).*

Kawamura et al., "Encoderless Robot Motion Control using Vision Sensor and Back Electromotive Force", 2014 IEEE/RSJ International Conference on Intelligent Robots and Systems (IROS 2014), Sep. 2014, pp. 1609-1615.

Chen et al., "Practical Industrial Robot Zero Offset Calibration", 4th IEEE Conference on Automation Science and Engineering, Aug. 2008, pp. 516-521.

Censi et al., "Simultaneous Calibration of Odometry and Sensor Parameters for Mobile Robots", IEEE Transactions on Robotics, Apr. 2013, pp. 475-492, vol. 29, No. 2.

Stolt et al., "Force Controlled Robotic Assembly without a Force Sensor", 2012 IEEE International Conference on Robotics and Automation, May 2012, pp. 1538-1543.

Hasan et al., "Path Planning Algorithm Development for Autonomous Vacuum Cleaner Robots", 3rd International Conference on Informatics, Electronics & VISION 2014, 2014.

Yoshiki Ichioka et al., Optical Information Processing and Beyond, IEEE, vol. 84, No. 5, May 1996, pp. 694-719.

Lucas de Souza Ribeiro et al., Development of a Hardware Platform for Detection of Milk Adulteration Based on Near-Infrared Diffuse Reflection, IEEE, vol. 65, No. 7, Jul. 2016, pp. 1698-1706.

Adi Bonen et al., A Novel Optoelectronic Interface-Circuit Design for Sensing Applications, IEEE, vol. 45, No. 2, Apr. 1996, pp. 580-584.

Takahiro Numai, Optical Information Processing, 2010 John Wiley & Sons, Inc., pp. 353-366. ,2010.

* cited by examiner

ELECTRONIC DEVICE CONTROLLING LIGHT SOURCES ACCORDING TO OPTICAL VARIATION

CROSS REFERENCE TO RELATED APPLICATIONS

This application is a continuation application of U.S. application Ser. No. 17/970,596, filed on Oct. 21, 2022, which is a continuation application of U.S. application Ser. No. 16/425,955, filed on May 30, 2019, which is a continuation-in-part of U.S. application Ser. No. 15/841,376, filed on Dec. 14, 2017, which claims the benefit of U.S. Provisional Application No. 62/514,349, filed on Jun. 2, 2017. The contents of these applications are incorporated herein by reference.

BACKGROUND OF THE INVENTION

1. Field of the Invention

The present invention relates to an electronic device with a plurality of light sources, and particularly relates to an electronic device which can control light sources according to optical variation.

2. Description of the Prior Art

As technology advances, an auto clean machine (e.g. a robot cleaner) becomes more and more popular. However, a conventional auto clean machine always has no proper mechanism for determining the existence of a cliff. The cliff can mean, for example, a height difference between two surfaces of different stairs.

Besides, different types of surface are suitable for different auto clean machine parameters. For example, the surface A is suitable for a stronger suction power or the dust thereon cannot be cleaned, and surface B is suitable for a weaker suction power or it may be damaged. However, the conventional auto clean machine cannot determine a surface type. The user must manually input the surface type to the conventional auto clean machine.

SUMMARY OF THE INVENTION

One objective of the present invention is to provide an electronic device which can determine the existence of a cliff.

One embodiment of the present invention discloses an electronic device, comprising: a first light source, configured to emit first light; a second light source, configured to emit second light; an optical sensor, configured to sense optical data generated according to reflected light of the second light or according to reflected light of the first light; and a control circuit, configured to analyze optical information of the optical data. If the control circuit determines variation of the optical information is larger than a variation threshold, the control circuit controls the first light source to be non-activated and the second light source to be activated.

In view of above-mentioned embodiments, the existence of a cliff can be automatically determined based on optical data. Therefore, the user does not need to manually input related information.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided to explain the concept of the present invention. Please note, each component of the embodiments can be implemented by hardware (e.g. a circuit or a device) or firmware (e.g. a processor installed with at least one program). Additionally, the terms "first", "second" . . . in the specification only mean the components or the steps are different ones, and do not mean the sequence thereof.

Figure 1:
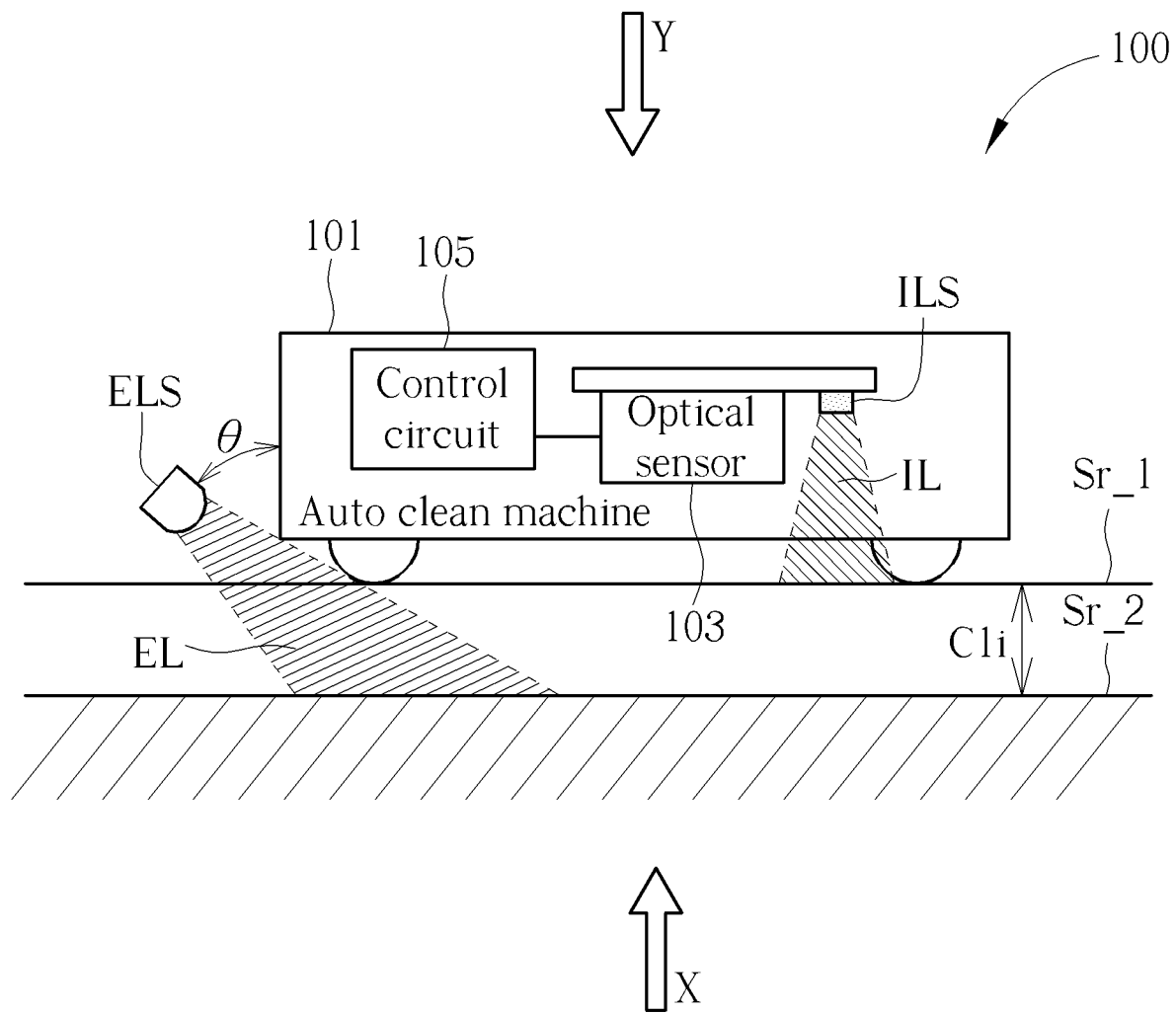
FIG. 1 is a schematic diagram illustrating an auto clean machine according to one embodiment of the present invention.

FIG. 1 is a schematic diagram illustrating an auto clean machine 100 according to one embodiment of the present invention. As illustrated in FIG. 1, the auto clean machine 100 comprises a chassis 101, an optical sensor 103, a control circuit 105, an inner light source ILS and an external light source ELS.

The internal light source ILS is located inside the chassis 101, and is configured to emit internal light IL. The external light source ELS is located outside the chassis 101, and is configured to emit external light EL. In one embodiment, external light source ELS is located on a side of the chassis 101, which is perpendicular with a bottom and a top of the chassis 101. Reflected light of the external light EL is generated when the external light EL reaches the surface Sr. Similarly, reflected light of the internal light IL is generated when the internal light IL reaches the surface Sr. The surface Sr_1 can be any surface that the auto clean machine 100 can be provided on and track on, for example, a ground.

The external light source ELS can be provided to the auto clean machine 100 via various structures. For example, in one embodiment the auto clean machine 100 comprises a protruding part and the external light source ELS is provided in or on this protruding part. For another example, the external light source ELS is provided in a movable part, such that it can move into the chassis 101 if it is de-activated, and can move external to the chassis 101 if it is activated.

The optical sensor 103 is configured to sense optical data generated according to reflected light of the external light EL or according to reflected light of the internal light EL. In following embodiments, the optical sensor 103 is an image sensor and the optical data are images, but are not limited.

In one embodiment, the optical sensor 103 and the inner light source ILS are provided on the same circuit board, but are not limited, too.

The control circuit 105 is configured to analyze optical information of the optical data. In one embodiment, if the auto clean machine 100 in a normal mode, which means the auto clean machine 100 normally operates to clean the surface Sr, the internal light source ILS is activated (i.e. can generate the internal light IL), and the external light source ELS is de-activated (i.e. cannot generate the external light EL). Also, when the auto clean machine 100 enters a determining mode to determine a cliff exists or not, the chassis 101 can prevent the optical sensor 103 from directly receiving the external light EL. However, the optical sensor 103 can still receive reflected light of the external light EL in the determining mode.

If the internal light source ILS is activated, the external light source ELS is de-activated and the control circuit 105 determines variation of the optical information is larger than a variation threshold, the auto clean machine 100 enters the determining mode. In the determining mode, the control circuit 105 changes the internal light source ILS to be non-activated and the external light source ELS to be activated. After that, the control circuit 105 determines whether a cliff exist or not according to the optical information of the optical data generated according to reflected light of the external light EL after entering the determining mode.

Detail contents of determining whether a cliff exists or not are illustrated as below. As above-mentioned, when the auto clean machine 100 operates in the normal mode, the internal light source ILS is activated and the external light source ELS is de-activated. Accordingly, in such case the optical sensor 103 can sense the optical data generated by reflected light of the internal light source ILS, and the control circuit 105 can calculate the variation of the optical information of the optical data. In one embodiment, the optical information comprises at least one following parameter: an image quality of images, a pixel average value of images, and an exposure time of images. For example, the optical information comprises an image quality of images and a pixel average value of images. The exposure time means a necessary time for at least one exposure value of at least one image to reach a predetermined value. For example, if the optical sensor 103 needs 1 second to expose the image to generate an image with a predetermined exposure value, the exposure time is 1 second.

Figure 2:
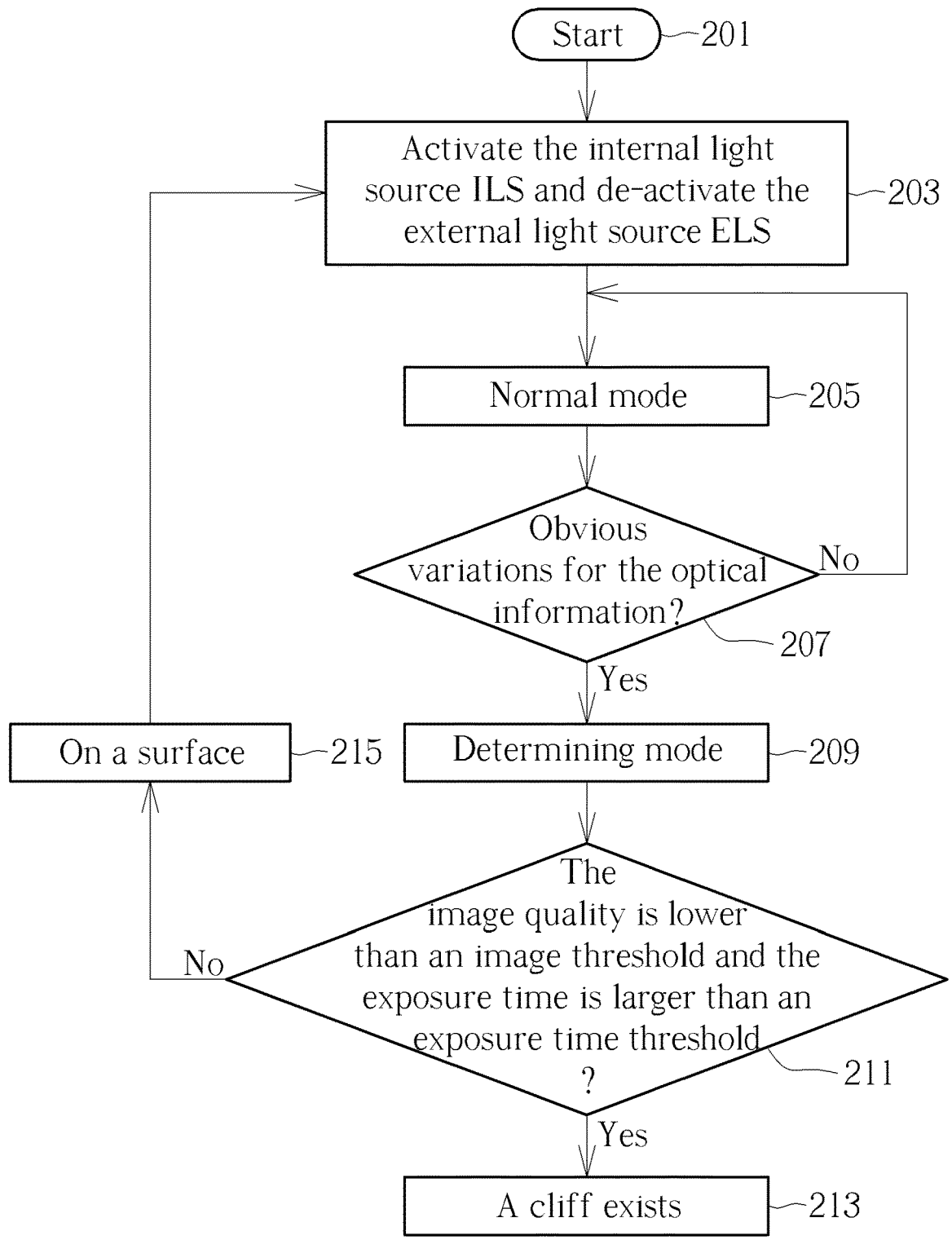
FIG. 2 is a flow chart illustrating steps of determining the existence of a cliff according to one embodiment of the present invention.

The above-mentioned image quality, the pixel average value, and the exposure time may have an obvious variation when the surface which the auto clean machine 100 is located changes, since the material of the surface may be different (e.g. wood, stone, plastic . . . ) and different materials may have different abilities for absorbing light and reflecting light. Also, the image quality, the pixel average value, and the exposure time may have an obvious variation when the auto clean machine 100 approaches a cliff and none of the internal light IL or only few of the internal light IL can reach the lower surface below the cliff (e.g. the surface Sr_2 in FIG. 1). As above-mentioned, the cliff can mean a height difference between two different ones of stairs. For example, as shown in FIG. 2, the surface Sr_1 is a surface of a ground which the auto clean machine is located on, and the surface Sr_2 is a surface of a stair going down. In such case, the cliff Cli means the height difference between the surface Sr_1 and the surface Sr_2.

Therefore, if the control circuit 105 determines the optical information has an obvious variation when the auto clean machine 100 is in the normal mode, the control circuit 105 controls the auto clean machine 100 to enter the determining mode. After that, the control circuit 105 determines whether the cliff Cli exists or not according to the optical information of the optical data generated according to reflected light of the external light EL. In one embodiment, the control circuit 105 determines the cliff Cli exists if the image quality is lower than an image threshold. In another embodiment, the control circuit 105 determines the cliff Cli exists if the pixel average value is lower than a pixel threshold. In another embodiment, the control circuit 105 determines the cliff Cli exists if the exposure time is larger than an exposure time threshold.

FIG. 2 is a flow chart illustrating steps of determining the existence of a cliff according to one embodiment of the present invention, which comprises the steps of:

Step 201
Start.

Step 203
Activate the internal light source ILS and de-activate the external light source ELS.

Step 205
The auto clean machine 100 operates in the normal mode to clean a surface which the auto clean machine 100 is provided on.

Step 207
Does the control circuit 105 detect obvious variations for the optical information? If yes, go to step 209, if not, go back to normal tracking 205.

Step 209
The auto clean machine 100 is switched to the determining mode, in which the internal light source ILS is de-activated and the external light source ELS is activated.

Step 211
The control circuit 105 determines a relation between the optical information and a corresponding threshold. As above-mentioned, the optical information comprises at least one following parameter: an image quality of images, a pixel average value of images, and an exposure time of images. For example, the optical information comprises an image quality of images and a pixel average value of images.

In the embodiment of FIG. 2, the control circuit 201 determines if the image quality is lower than an image threshold and if the exposure time is larger than an exposure time threshold. If yes, go to step 213, if not, go to step 215.

Step 213
The control circuit 105 determines a cliff Cli exists.

Step 215
The control circuit 105 determines the auto clean machine 100 is still on a surface, and then goes back to the step 203.

Figure 3:
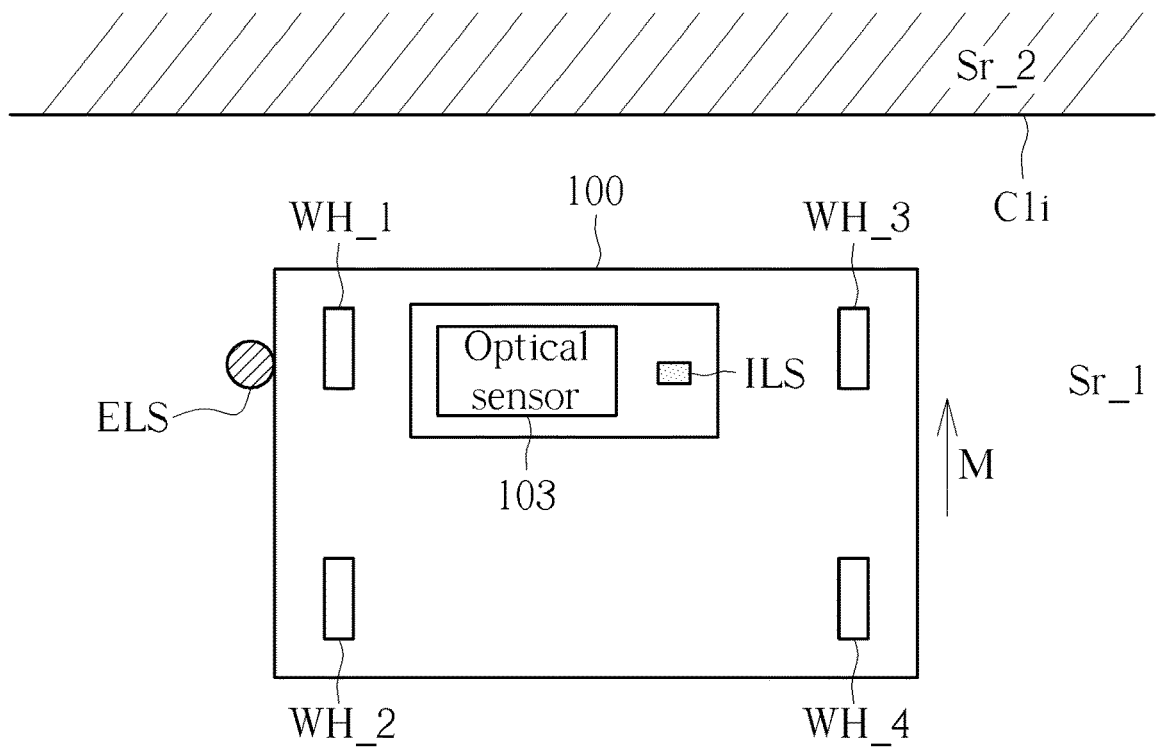
FIG. 3 and FIG. 4 are schematic diagrams illustrating the auto clean machine of FIG. 1 from different perspectives.
Figure 4:
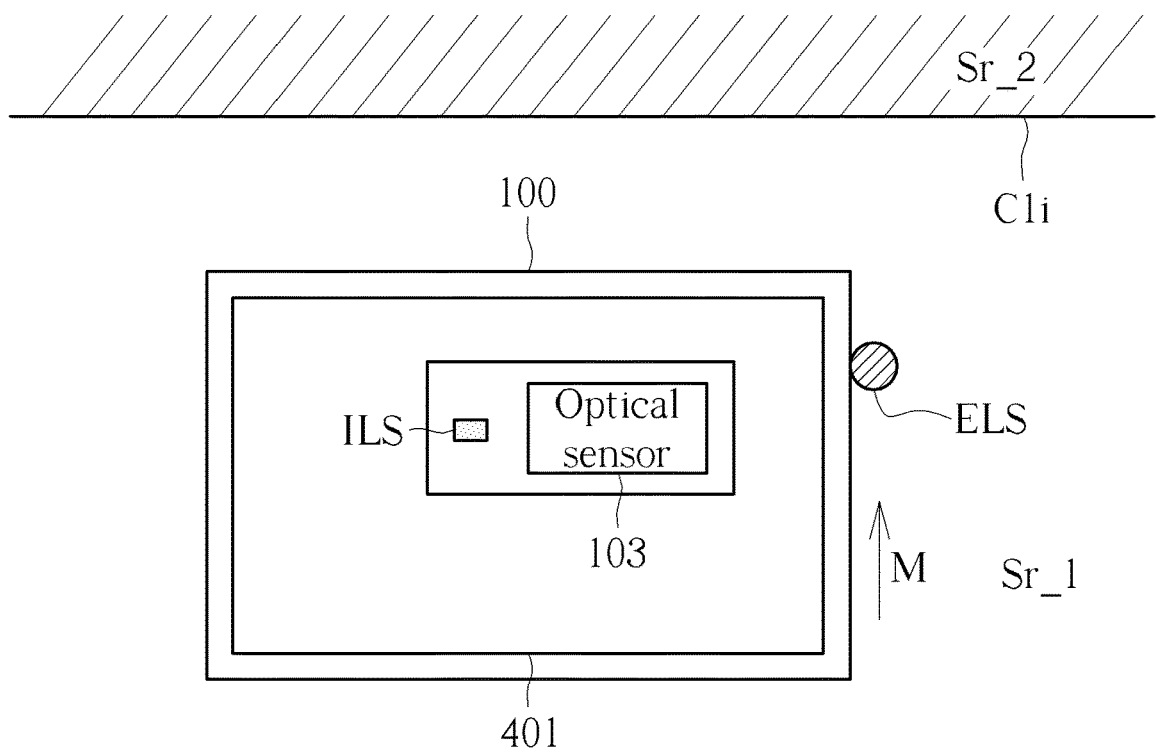

FIG. 3 and FIG. 4 are schematic diagrams illustrating the auto clean machine of FIG. 1 from different perspectives. Based on FIG. 3 and FIG. 4, the structures of the auto clean machine 100 can be more clearly understood. FIG. 3 is a bottom view of the auto clean machine 100, which means the clean machine 100 is view in the X direction shown in FIG. 1. As illustrated in FIG. 3, the external light source ELS is in line with the optical sensor 103 with a defined distance, the arrow M means the moving direction of the auto clean machine 100, and the labels Wh_1, Wh_2, Wh_3 and Wh_4 are wheels of the auto clean machine 100. FIG. 4 is a top view of the auto clean machine 100, which means the clean machine 100 is view in the Y direction shown in FIG. 1. As illustrated in FIG. 4, the external light source ELS is in line with the optical sensor 103 with a defined distance, the arrow M means the moving direction of the auto clean machine 100, and a user can open the cover 401 to clean the auto clean machine 101.

Please note, the structures of the auto clean machine provided by the present invention are not limited to the embodiments illustrated in FIGS. 1, 3, 4. Any structure that can perform the same function should also fall in the scope of the present invention.

Figure 5:
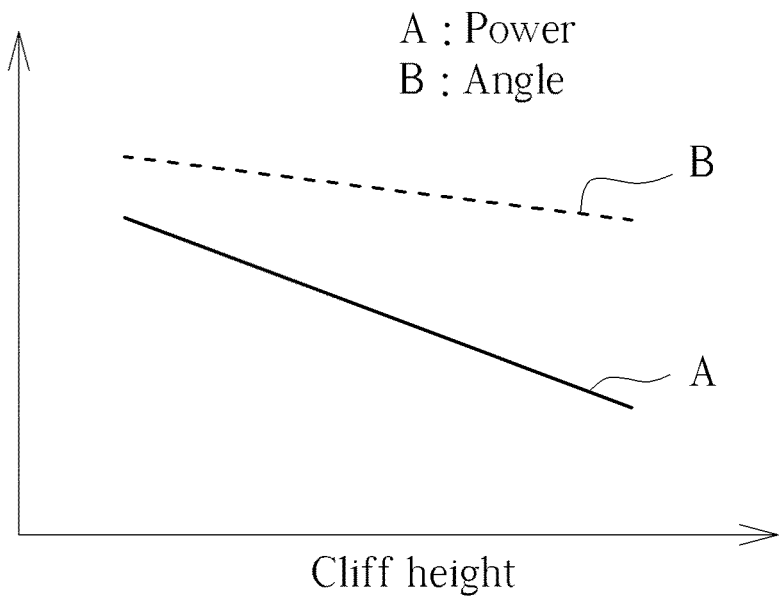
FIG. 5 is a schematic diagram illustrating a relation between an external light power and a detectable cliff height, and a relation between an external light angle and a detectable cliff height, according to one embodiment of the present invention.

The angle between the chassis 101 and the emitting direction of the external light source (i.e. the angle θ illustrated in FIG. 1) can affect the detectable cliff height. Besides, the power of the external light source ELS can affect the detectable cliff height as well. FIG. 5 is a schematic diagram illustrating a relation between an external light power and a detectable cliff height, and a relation between an external light angle and a detectable cliff height. As illustrated in FIG. 5, the Y axis of line A means the power of the external light source ELS (i.e. the light intensity of the external light EL). Also, the Y axis of line B means the angle of the external light emitting. The X axis of the line A and the X axis of the line B both mean the cliff height.

Accordingly, in view of FIG. 5, if the angle is smaller, the detectable cliff height is larger. Also, if the power of the external light source ELS is lower, the detectable cliff height is smaller. That is, the angle of the external light emitting and the power of the external light source ELS are inversely proportional to the detectable cliff height.

A cliff determining method can be acquired in view of above-mentioned embodiments. Please note such cliff determining method can be applied to any electronic device comprising an internal light source configured to emit internal light and an external light source configured to emit external light, rather than limited to an auto clean machine. The cliff determining method comprises: activating the internal light source and de-activating the external light; changing the internal light source to be non-activated and the external light source to be activated, if variation of optical information generated according to the internal light is larger than a variation threshold; and determining whether a cliff exists or not according to the optical information of the optical data generated according to reflected light of the external light, after the internal light source is non-activated and the external light is activated.

Figure 6:
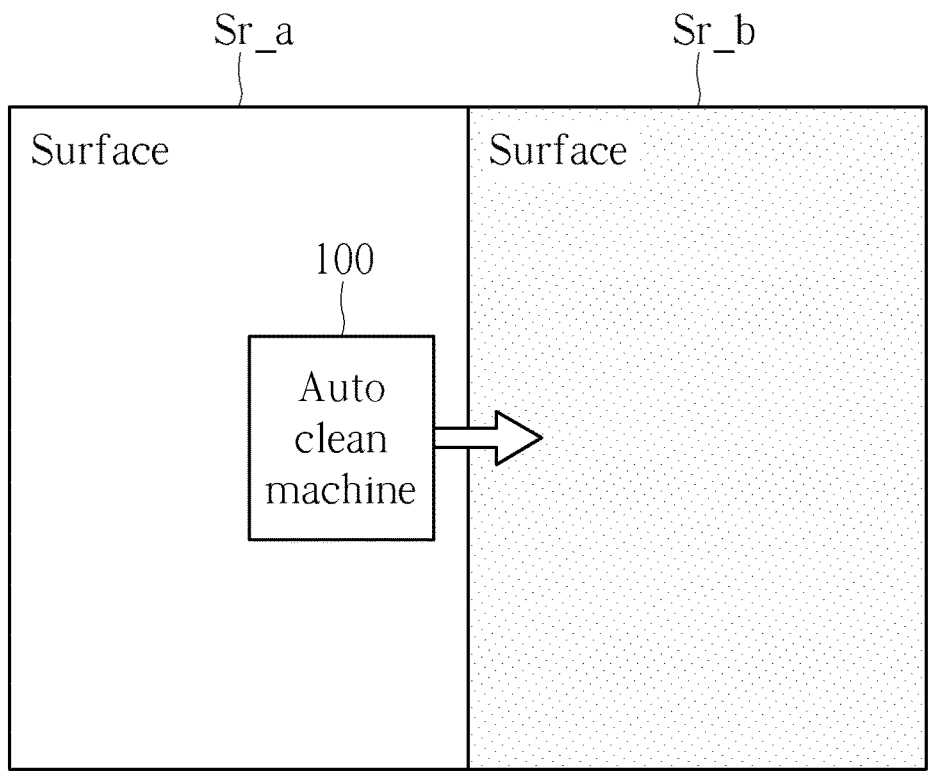
FIG. 6 is a schematic diagram illustrating the auto clean machine is moving across different types of surfaces.

Besides determining the existence of the cliff, the above-mentioned concept can be applied to determine a surface type. As illustrated in FIG. 6, if the auto clean machine 100 moves from the surface Sr_a to the surface Sr_b in the normal mode. The optical information may have an obvious variation, since the material of the surfaces Sr_a and Sr_b may be different and different materials may have different abilities for absorbing light and reflecting light. For example, if the surface Sr_a is a wool carpet and the surface Sr_b is wood, the optical information may change a lot. In one embodiment, the optical information comprises at least one following parameter: an image quality of images, a pixel average value of images, and an exposure time of images. Besides these parameters, the maximum pixel value and the sum of pixel values can be applied to determine the surface type as well.

Figure 7:
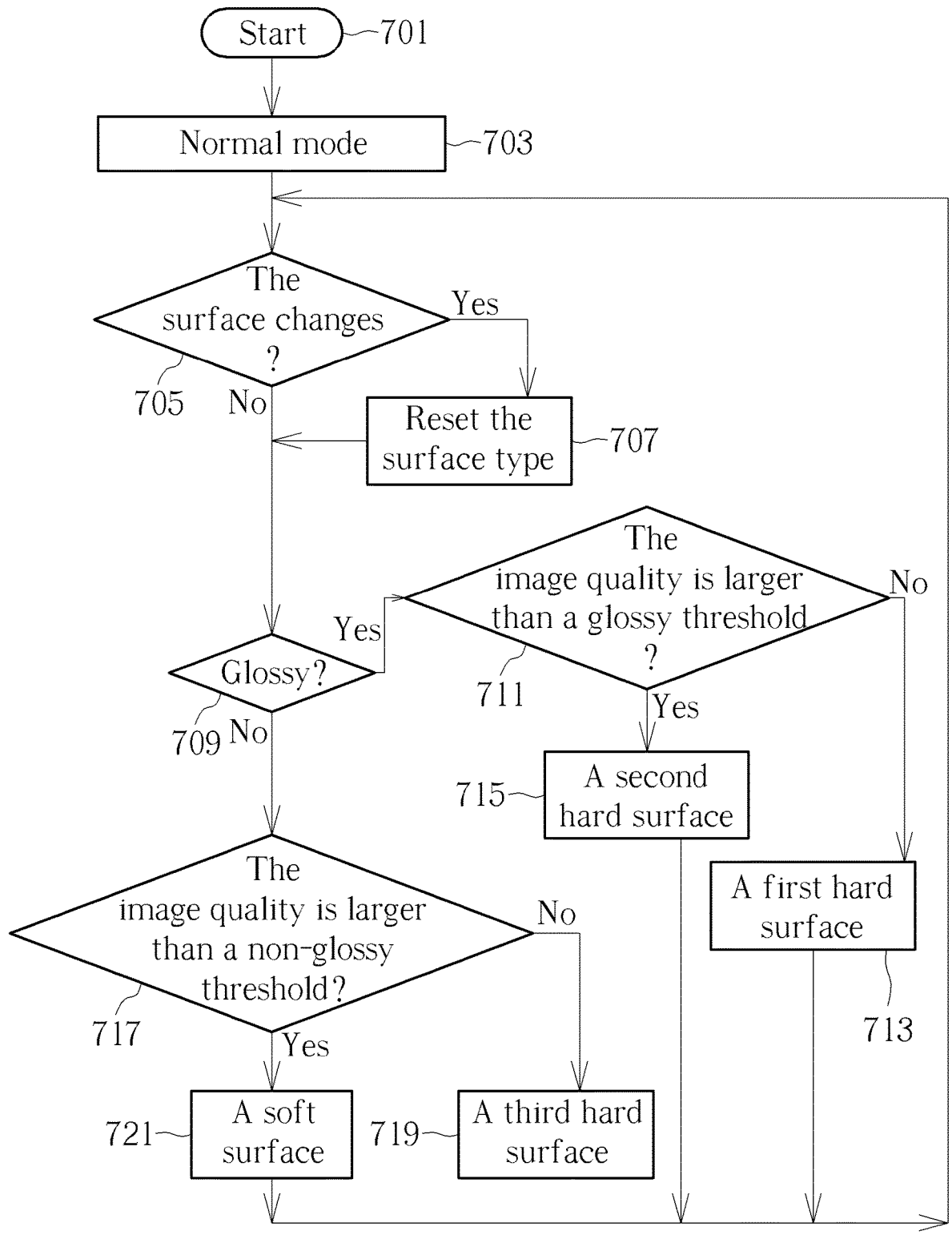
FIG. 7 is a flow chart illustrating steps of determining the type of surface according to one embodiment of the present invention.

FIG. 7 is a flow chart illustrating steps of determining the type of surface according to one embodiment of the present invention, which comprises following steps:

Step 701
Start.
Step 703
The auto clean machine 100 operates in the normal mode.

Step 705
Determine whether the surface changes or not. For example, determine if the optical information has obvious variation. If yes, go to step 707, if not, go to step 709.
Step 707
Reset the surface type, and go to step 709.
Step 709
The surface is glossy? If yes, go to step 711, if not, go to step 717.
Step 711
The image quality is larger than a glossy threshold? If yes, go to step 715, if not, go to step 713.
Step 713
Determine the surface type is a first hard surface such as tiles.
Step 715
Determine the surface type is a second hard surface such as granite.
Step 717
The image quality is larger than a non-glossy threshold? If yes, go to step 721, if not, go to step 719.
Step 719
Determine the surface type is a third hard surface such as wood.
Step 721
Determine the surface type is a soft surface such as carpet.

After the steps 713, 715, 719 and 721, the flow is back to the step 705. It will be appreciated that the steps of determining a surface type according to the optical information is not limited to the flow illustrated in FIG. 7. Please note, in one embodiment, the optical data applied for determining the surface type is generated according to the inter light IL. Accordingly, in such case, the auto clean machine can only comprise the internal light source ILS rather than the internal light source ILS and the external light source ELS.

In view of above-mentioned embodiments, the existence of a cliff and the surface and the surface type can be automatically determined based on optical data. Therefore, the user does not need to manually input related information.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device, comprising:
   a first light source, configured to emit first light;
   a second light source, configured to emit second light;
   an optical sensor, configured to sense optical data generated according to reflected light of the second light or according to reflected light of the first light; and
   a control circuit, configured to analyze optical information of the optical data;
   wherein if the control circuit determines variation of the optical information is larger than a variation threshold, the control circuit controls the first light source to be non-activated and the second light source to be activated.

2. The electronic device of claim 1, wherein the control circuit determines whether a cliff exists or not according to the optical information of the optical data generated according to reflected light of the second light after the first light source is non-activated and the second light is activated.

3. The electronic device of claim 1, wherein the optical data comprises at least one image, and the optical information comprises an image quality of the image.

4. The electronic device of claim 3, wherein the control circuit determines the cliff exists if the image quality is lower than an image threshold.

5. The electronic device of claim 1, wherein the optical data comprises at least one image, and the optical information comprises a pixel average value of the image.

6. The electronic device of claim 5, wherein the control circuit determines the cliff exists if the pixel average value is lower than a pixel threshold.

7. The electronic device of claim 1, wherein the optical data comprises at least one image, and the optical information comprises an exposure time of the image.

8. The electronic device of claim 7, wherein the control circuit determines the cliff exists if the exposure time is larger than an exposure time threshold.

9. The electronic device of claim 1, wherein an angle and a location of the second light source, and a location of the optical sensor make the optical sensor can sense the reflected light of the second light but cannot directly sense the second light.

10. The electronic device of claim 1, wherein the control circuit determines a type of a surface which the electronic device is located on according to the optical information of the optical data generated according to reflected light of the first light.

11. The electronic device of claim 10, wherein the control circuit determines the type of the surface according to an image quality of the optical data generated according to reflected light of the first light.

* * * * *